United States Patent [19]
McDaniel

[11] Patent Number: 5,753,325
[45] Date of Patent: May 19, 1998

[54] ARTICLES HAVING SCUFF RESISTANT LUSTROUS COATINGS

[76] Inventor: Harry C. McDaniel, 2400 Grandview Ave., #19, Cincinnati, Ohio 45206

[21] Appl. No.: 661,784

[22] Filed: Jun. 13, 1996

[51] Int. Cl.⁶ .................................................. A47G 19/22
[52] U.S. Cl. ........................................ 428/34.7; 428/432
[58] Field of Search ................................... 428/34.7, 432

[56] References Cited

U.S. PATENT DOCUMENTS

| | | | |
|---|---|---|---|
| 3,087,828 | 4/1963 | Linton | 106/291 |
| 3,087,829 | 4/1963 | Linton | 106/291 |
| 3,331,699 | 7/1967 | Marshall et al. | 106/291 |
| 3,615,327 | 10/1971 | McLary | 65/60 |
| 3,645,778 | 2/1972 | Nesteruk | 117/93.4 |
| 3,713,867 | 1/1973 | Parkinson et al. | 117/54 |
| 4,343,641 | 8/1982 | Scholes | 65/60.2 |
| 4,418,099 | 11/1983 | Cuevas et al. | |
| 4,431,692 | 2/1984 | Hofmann et al. | |
| 5,022,923 | 6/1991 | Rau et al. | 106/415 |
| 5,026,429 | 6/1991 | Mronga | 106/400 |
| 5,177,124 | 1/1993 | Questel et al. | |
| 5,280,052 | 1/1994 | Questel et al. | |
| 5,366,763 | 11/1994 | McDaniel | 427/193 |

FOREIGN PATENT DOCUMENTS

| | | |
|---|---|---|
| 0 270 472 A | 6/1988 | European Pat. Off. . |
| 0 358 949 A | 3/1990 | European Pat. Off. . |
| 0 439 111 A | 7/1991 | European Pat. Off. . |
| 0 578 829 A | 1/1994 | European Pat. Off. . |

*Primary Examiner*—Christopher Raimund
*Attorney, Agent, or Firm*—Wood, Herron & Evans, L.L.P.

[57] ABSTRACT

An article having a scuff resistant lustrous coating. The article comprises a vitreous surface with an inorganic based luster pigment layer bonded to the vitreous surface. An organic layer covers the luster pigment layer to provide the scuff resistant coating. In one specific embodiment, the article is a glass container having the scuff resistant coating of the present invention.

29 Claims, 1 Drawing Sheet

ARTICLES HAVING SCUFF RESISTANT LUSTROUS COATINGS

FIELD OF THE INVENTION

The present invention relates to coatings, more specifically, lustrous coatings for vitreous surfaces that are scuff resistant.

BACKGROUND OF THE INVENTION

Luster pigments have a unique appearance. They have a pearlescent appearance which is pleasing to the eye. Those luster pigments which have been widely commercialized are mica flakes coated with a metal oxide such as titanium dioxide and/or ferric oxide. They are described in U.S. Pat. Nos. 3,087,828 and 3,087,829. The pigments are recommended for use in many formulations and have found wide acceptance in automotive paints, printing inks, plastic bottles, cosmetics and simulated pearls. Other luster pigments which are commercially available, though have not been as widely used, have an inorganic platelet-shaped particle such as glass with a metal oxide coating. They are described in U.S. Pat. No. 3,331,699. Organic luster pigments, as described in U.S. Pat. No. 5,026,429, are also available.

Use of the luster pigments in vitreous compositions, however, has been limited. Vitreous compositions, per se, are well known. They are based on ground glass, glass forming materials or a mixture of both. Such compositions can be coatings, which are applied to a substrate and then heated or fired to a temperature sufficient to cause the coating components to melt. When cooled, a thin coating of glass is formed on the substrate. The coatings are commonly referred to as vitreous enamels when the substrate is a metal and vitreous glazes when the substrate is a ceramic. The coatings are used to decorate the substrate with color or artistic renditions as well as add to the substrate's durability in terms of scratch and mar resistance, moisture barrier, etc.

The customary and normal procedure for incorporating pigments in vitreous compositions is to include them in the body of the composition's glass component. Alternatively, the pigments are incorporated in a vitreous flux which is applied to a vitreous substance. In either case, the vitreous composition must be heated to a high temperature to fuse the glass components. It follows that any pigment included in the formulation must be able to withstand the high temperatures and the chemical action of the glass components during fusing. This has not been a problem with many of the pigments which are available. Data sheets provided by the pigment suppliers as well as acquired knowledge of the artisan or manufacturer are sufficient to enable selection of the proper pigment. However, understandably there are certain pigments either because of their color or other visual effect that cannot be used in certain vitreous compositions. It has been found that these luster pigments are not stable at the elevated temperatures experienced during firing of the vitreous composition. It appears that the glass components attack the pigments at the elevated temperatures. The resulting formed surfaces simply do not have the desired appearance.

The instability problem of luster pigments in vitreous compositions, including coatings and substrate bodies is recognized. U.S. Pat. No. 5,022,923 acknowledges the problem and suggests a solution. The described pigments are provided with a top coating of tin dioxide and/or cerium dioxide. Necessarily, the specially treated luster pigments are more expensive. Additionally, while more stable, their stability is less than ideal. Certain applications of the disclosed luster pigments still do not result in the desired appearance. Furthermore, when the luster pigments are incorporated in a vitreous flux, an inordinate amount of luster pigment is required to obtain proper color intensity. Another drawback is the fact that transparent fluxes must be used for the desired color effects.

Most glass bottles and jars have a two layer scuff resistant coating to minimize unsightly scratch and scuff marks and to prevent breakage of the glass articles. The initial coating is applied to the glass article as it exits the glass forming machine. This first coating is called the "hot end" coating because it is applied to the glass article while it is still hot and prior to entry into an annealing lehr. The hot end coating is formed by spraying organometallic compounds such as metal chlorides or metal tetraalkyl titanates on the hot glass article, causing the precursor to thermally decompose and form a metal oxide. Typically, the metal compounds include metals of tin or titanium, and the respective metal oxide formed is tin oxide or titanium oxide.

The metal oxide layer serves as a bonding layer for the second coating that is applied after the bottle has exited the annealing lehr. The second coating typically is an organic layer such as polyethylene, oleic acid, a stearate, or a wax. The second coating provides a lubricating film to prevent the bottles from scratching. The combined coatings of the metal oxide layer and the organic lubricating layer provide a glass article with scratch resistance and a lubricated surface resistant to scratching and scuffing. U.S. Pat. Nos. 3,368,915, 3,425,859, and 3,554,787 disclose metal oxide and organic coatings and methods of applying these coatings to glass bottles and jars.

The present glass article manufacturing methods have many problems associated with using metal oxide hot end coatings. The metal oxide coating process is expensive, requires special equipment, and causes air pollution and corrosion from the byproducts formed by the process. Extensive research and development efforts have focused on replacing the current metal oxide application process for glass article manufacturing. For example, U.S. Pat. No. 4,343,641 issued to Scholes discloses a method of adhering minus 200 mesh sized glass particles to a glass article prior to annealing and applying an overcoat of an organic polymer such as polyethylene after annealing. This method, however, has not replaced the current metal oxide formation process used in glass article manufacturing.

Accordingly, there is a need to replace the current metal oxide formation process used in glass manufacturing. There is a further need to provide glass and other articles having a scuff resistant coating that is produced by a less expensive process and does not present the pollution and corrosion problems associated with current processes used to form metal oxide layers on glass bottles.

SUMMARY OF THE INVENTION

This invention is directed to articles having a scuff resistant lustrous coating. In general, the article has a vitreous surface with an inorganic based luster pigment layer bonded to the vitreous surface. An organic layer covers the pigment layer to provide the scuff resistant lustrous coating.

The inorganic based luster pigment layer is generally no thicker than about 0.1 to 3 microns, the thickness of a single platelet-shaped particle. Since the pigment layer is discontinuous and the platelets are flat and adjacent to each other, the more particles within a given area, the greater the luster intensity. For thicknesses greater than 3 microns and less than about 25 microns, there is an overlapping of the platelets, and the luster pigments will have fixed to the vitreous surface like fishscales. For luster pigments applications thicker than about 25 microns, the luster pigment platelets are not in sufficient contact with the vitreous surface to fix at these higher thicknesses, and the excess pigment is rubbed or washed off.

When the inorganic based luster pigment is admixed with a transparent soft fusing flux, rather than applied as a coating to the fused or unfused vitreous surface without added flux or frit, the combined luster pigment and flux layer will be thicker than 25 microns once it is fused to the underlying vitreous surface.

In general, the particle size of the soft fusing flux will be from about 43 microns (325 mesh) to about 74 microns (200 mesh), and the mixture of flux and luster pigment will contain at least about 10% luster pigment. Depending upon the thickness of the coating applied, the thickness of the bonded inorganic based layer will range from about 45 microns to about 450 microns with the thinner coatings preferred for lower costs.

The inorganic luster pigment layer contains inorganic platelet-shaped particles of from about 1 micron to about 180 microns in length, about 1 micron to about 180 microns in width, and about 0.1 to 3 microns in thickness. These platelet-shaped particles contain mica or glass, and they have a surface coating of at least one metal oxide layer. In one embodiment the mica is in the form of flakes coated with titanium dioxide, ferric oxide, or a mixture thereof.

The scuff resistant coating of the present invention is provided by covering the inorganic based luster pigment layer with a organic coating. In one embodiment, the organic coating is a polymer that directly covers the inorganic based luster pigment layer, but alternative embodiments may include an intermediate layer between the luster pigment layer and the polymer layer. The polymer can be a polyolefin such as polyethylene, polypropylene, or polyvinyl alcohol. Alternatively, the organic layer can be a fatty acid ester or a salt thereof The scuff resistant coatings of the present invention may be applied by conventional application methods which are well known in the art. The luster pigment layer, can be applied, for example, by electrostatic deposition methods, dipping, spraying, or brushing. Similarly, the organic coating can be applied by various methods such as spraying, dipping, or brushing.

In one embodiment the scuff resistant coatings are applied to a glass container, such as a jar or bottle. The article having the scuff resistant coating is produced by a process that eliminates the environmental drawbacks associated with conventional metal oxide coating processes. Additionally, the articles of the present invention have the additional advantage of a lustrous appearance that conventional metal oxide coated bottles and jars do not exhibit.

The above and other objects and advantages of the present invention shall be made apparent from the accompanying drawings and the description thereof.

BRIEF DESCRIPTION OF THE DRAWING

The FIGURE is a perspective view of an embodiment of an article having a scuff resistant lustrous coating of the present invention.

DETAILED DESCRIPTION OF SPECIFIC EMBODIMENTS

The present invention relates to articles having scuff resistant lustrous coatings. The FIGURE shows a nonlimiting example of an article 10 having such a coating, a beverage bottle. The article 10 comprises a vitreous surface 40, an inorganic based luster pigment 30 bonded to the vitreous surface, and an organic layer 20 covering the pigment layer to provide the scuff resistant lustrous coating.

The article can include various articles having a vitreous surface. Such articles are described in my U.S. Pat. No. 5,366,763 and my copending patent application filed concurrently with this application, entitled "Method for Electrostatically Applying Luster Pigments onto Vitreous Surfaces," Ser. No. 08/663,569 filed Jun. 13, 1996, now abandoned, both of which is also expressly incorporated herein in their entirety by reference.

The articles having a vitreous surface can include a vitreous enamel overlying a metal or glass substrate, or a vitreous glaze overlying a glass, enameled metal, glazed ceramic or ceramic substrate. Alternatively, the vitreous surface can be glass.

The luster pigment layer 30 is greater than 0.1 micron thick and less than 450 microns thick. The thickness of the luster pigment layer 30 is greater than 0.1 micron and less than about 3 microns if there is no overlapping of the luster pigment platelets, greater than about 3 microns and less than about 25 microns if there is overlapping, and about 45 microns to about 450 microns if the luster pigment is admixed at a 10% or higher level with a transparent soft fusing flux, having a fusing temperature in the range of about 900° F. to about 1150° F.

The inorganic based luster pigment layer contains inorganic platelet-shaped particles of from about 1 micron to about 180 microns in length, about 1 micron to about 180 microns in width, and about 0.1 to 3 microns in thickness. The platelet shaped particles having a coating of at least one metal oxide layer and can contain mica. The mica may be in the form of flakes coated with titanium dioxide, ferric oxide or a mixture thereof. In an alternative embodiment, the inorganic platelet shaped particles contain glass coated with titanium dioxide, ferric oxide, or a mixture thereof. Further details on the luster pigment may be found in my U.S. Pat. No. 5,366,763.

The organic layer 20 is a polymer, which can include various polyolefins and their copolymers. The polymer can be, for example, polyethylene, polypropylene, polyvinyl acetate, polyvinyl chloride, polyvinyl benzoate, polydibutyl fumarate, polymethyl methacrylate, polyvinyl alcohol, and polyoxyethylene. The polymer can also be an organo polysiloxane. Alternatively, the organic layer can be a fatty acid ester or a salt thereof, such as stearates. More particularly, the stearate can be calcium stearate. The organic layer can also be a fatty acid ester of glycerol such as oleic acid. The organic layer may also be a wax, an acrylic resin or an epoxy resin.

In one specific embodiment, the article of the present invention is a glass container, such as a jar or beverage bottle. The inorganic based luster pigment layer is applied to the glass container by conventional methods such as spraying, dipping, brushing or electrostatic methods. The organic layer is also provided by conventional coating methods such as spraying, dipping, coating or brushing. The articles of the present invention are scuff resistant and have a lustrous appearance.

Furthermore, an inorganic based luster pigment layer has the added advantage over conventional metal oxide coatings of being able to provide different colored coatings on bottles having the same base color. For example, a clear glass bottle can be colored various colors coating the bottle with different types of inorganic based luster pigments. These different colored bottles having a clear glass base can then be recycled together because during the recycling process the luster pigments lose their color when the glass is melted in the recycling process.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. An article having a scuff resistant lustrous coating comprising an article having a vitreous surface, an inorganic based luster pigment layer comprising luster pigment particles bonded directly to said vitreous surface, and an organic layer covering said pigment layer to provide the scuff resistant lustrous coating, wherein the organic layer is selected from the group consisting of a polymer, a wax, a fatty acid ester and a salt of a fatty acid ester, and further wherein said bonded inorganic based luster pigment layer has a thickness greater than about 0.1 microns and less than about 25 microns.

2. The article of claim 1 wherein said vitreous surface is a vitreous enamel overlying a metal substrate.

3. The article of claim 1 wherein said vitreous surface is a vitreous glaze overlying a ceramic substrate.

4. The article of claim 1 wherein said vitreous surface is glass.

5. The article of claim 1 wherein said vitreous surface is a vitreous enamel on glass.

6. The article of claim 1 wherein said vitreous surface is a vitreous overglaze overlying a glass, enameled metal, or glazed ceramic substrate.

7. The article of claim 1 wherein said inorganic based luster pigment layer contains inorganic platelet-shaped particles of from about 1 micron to about 180 microns in length, about 1 micron to about 180 microns in width, and about 0.1 to 3 microns in thickness, said particles having a surface coating of at least one metal oxide layer.

8. The article of claim 7 wherein said inorganic platelet-shaped particles contain mica.

9. The article of claim 8 wherein said mica is in the form of flakes coated with titanium dioxide, ferric oxide, or a mixture thereof.

10. The article of claim 7 wherein the inorganic platelet-shaped particles contain glass.

11. The article of claim 10 wherein said glass particles are coated with titanium dioxide, ferric oxide, or a mixture thereof.

12. The article of claim 1 wherein the organic layer is a polymer.

13. The organic layer of claim 12 wherein the polymer is a polyolefin.

14. The organic layer of claim 12 wherein the polymer is selected from the group consisting of polyethylene, polypropylene, polyvinyl acetate, polyvinyl chloride, polyvinyl benzoate, polydibutyl fumarate, polymethyl methacrylate, polyvinyl alcohol, polyoxyethylene, and their copolymers.

15. The organic layer of claim 12 wherein the polymer is an organopolysiloxane.

16. The article of claim 1 wherein the organic layer is a fatty acid ester or a salt thereof.

17. The organic layer of claim 16 wherein the fatty acid ester is a stearate.

18. The organic layer of claim 17 wherein the stearate is calcium stearate.

19. The organic layer of claim 16 wherein the fatty acid ester is a fatty acid ester of glycerol.

20. The organic layer of claim 19 wherein the fatty acid ester of glycerol is oleic acid.

21. The organic layer of claim 1 wherein the organic layer is selected from the group consisting of a wax, an acrylic resin, or an epoxy resin.

22. A glass container or bottle having a scuff resistant lustrous coating comprising an inorganic based luster pigment layer comprising luster pigment particles bonded directly to said glass container or bottle, and an organic layer covering said pigment layer to provide the scuff resistant lustrous coating, wherein the organic layer is selected from the group consisting of a polymer, a wax, a fatty acid ester and a salt of a fatty acid ester, and further wherein said bonded inorganic based luster pigment layer has a thickness greater than about 0.1 microns and less than about 25 microns.

23. The article of claim 22 wherein said inorganic based luster pigment layer contains inorganic platelet-shaped particles of from about 1 micron to about 180 microns in length, about 1 micron to about 180 microns in width, and about 0.1 to 3 microns in thickness, said particles having a surface coating of at least one metal oxide layer.

24. The article of claim 23 wherein said inorganic platelet-shaped particles contain mica.

25. The article of claim 24 wherein said mica is in the form of flakes coated with titanium dioxide, ferric oxide, or a mixture thereof.

26. The article of claim 23 wherein the inorganic platelet-shaped particles contain glass.

27. The article of claim 26 wherein the glass particles are coated with titanium dioxide, ferric oxide, or a mixture thereof.

28. An article having a scuff resistant lustrous coating comprising an article having a vitreous surface, an inorganic based luster pigment layer comprising luster pigment particles bonded to said vitreous surface, and an organic layer covering said pigment layer to provide the scuff resistant lustrous coating, wherein said bonded inorganic based luster pigment layer is a mixture of at least 10% luster pigment with a soft fusing flux, having a fusing temperature in the range of 900° F. to 1150° F., and further wherein said inorganic based luster pigment layer has a thickness of up to about 450 microns.

29. A glass container or bottle having a scuff resistant lustrous coating comprising an inorganic based luster pigment layer comprising luster pigment particles bonded to said glass container or bottle, and an organic layer covering said pigment layer to provide the scuff resistant lustrous coating, wherein said bonded inorganic based luster pigment layer is a mixture of at least 10% luster pigment with a soft fusing flux, having a fusing temperature in the range of 900° F. to 1150° F., and further wherein said inorganic based luster pigment layer has a thickness of up to about 450 microns.

* * * * *

UNITED STATES PATENT AND TRADEMARK OFFICE
CERTIFICATE OF CORRECTION

PATENT NO.  : 5,753,325

DATED       : May 19, 1998

INVENTOR(S) : McDaniel

It is certified that error appears in the above-identified patent and that said Letters Patent is hereby corrected as shown below:

Column 2, lines 30 and 31, please delete "U.S. Pat. Nos. 3,368,915, 3,425,859, and 3,554,787" and replace with --U.S. Pat. Nos. 3,368,915, 3,425,859, 3,522,075, and 3,554,787--.

Signed and Sealed this

First Day of September, 1998

Attest:

BRUCE LEHMAN

*Attesting Officer*  *Commissioner of Patents and Trademarks*